US012060880B2

(12) United States Patent
Wang

(10) Patent No.: US 12,060,880 B2
(45) Date of Patent: Aug. 13, 2024

(54) SELF-LUBRICATING PLUNGER, BUSHING FOR SELF-LUBRICATING PLUNGER AND METHOD FOR MANUFACTURING SAME

(71) Applicant: XIAMEN JJD MACHINERY CO., LTD, Xiamen (CN)

(72) Inventor: Hualan Wang, Xiamen (CN)

(73) Assignee: XIAMEN JJD MACHINERY CO., LTD, Xiamen (CN)

( * ) Notice: Subject to any disclaimer, the term of this patent is extended or adjusted under 35 U.S.C. 154(b) by 0 days.

(21) Appl. No.: 17/938,907

(22) Filed: Sep. 6, 2022

(65) Prior Publication Data

US 2024/0052828 A1 Feb. 15, 2024

(30) Foreign Application Priority Data

Aug. 12, 2022 (CN) ......................... 202210969715.2
Aug. 12, 2022 (CN) ......................... 202210969722.2

(51) Int. Cl.
*F04B 53/18* (2006.01)
*B22D 17/20* (2006.01)

(52) U.S. Cl.
CPC .......... *F04B 53/18* (2013.01); *B22D 17/2038* (2013.01); *F05D 2240/50* (2013.01); *F05D 2260/98* (2013.01)

(58) Field of Classification Search
CPC ............................ B22D 17/00; B22D 17/2038
See application file for complete search history.

(56) References Cited

U.S. PATENT DOCUMENTS 4,696,224 A * 9/1987 Mishima ............... F02F 7/0087 92/187
2005/0044988 A1* 3/2005 Hammond ............. B22F 1/148 419/33
2015/0001841 A1* 1/2015 Oshima ................ F16L 15/004 285/94
2016/0199909 A1* 7/2016 Sun .................... F16C 33/1095 428/553
2019/0186532 A1* 6/2019 Ito ............................ B22F 1/17
2020/0023503 A1* 1/2020 Malak .................... B23P 15/00

* cited by examiner

*Primary Examiner* — Connor J Tremarche

(57) ABSTRACT

A method for manufacturing a bushing of a self-lubricating plunger includes: S1. uniformly mixing a base metal powder with a reinforcing metal powder to obtain a mixture, putting the mixture into a mold for pressing by a hydraulic press machine to form a blank, then sintering the blank to form a tubular metal foundation having a plurality of micropores; S2. melting a metal matrix lubricant by heating up, wherein the metal matrix lubricant includes a metal substance of low melting point and a basic lubricating powder dispersed in the metal substance, and the metal substance has a melting point higher than a storage temperature of the bushing and lower than a working temperature of the plunger; and S3. immersing the tubular metal foundation in the molten metal matrix lubricant to fill the micropores of the tubular metal foundation with the metal matrix lubricant, then cooling down the temperature.

6 Claims, 3 Drawing Sheets

SELF-LUBRICATING PLUNGER, BUSHING FOR SELF-LUBRICATING PLUNGER AND METHOD FOR MANUFACTURING SAME

CROSS-REFERENCE TO RELATED APPLICATIONS

This application is based upon and claims priority to Chinese Patent Applications No. 202210969715.2, filed on Aug. 12, 2022, and Chinese Patent Application No. 202210969722.2, filed on Aug. 12, 2022, the entire contents of which are incorporated herein by reference.

TECHNICAL FIELD

The present disclosure relates to the technical field of die casting, in particular to a self-lubricating plunger, a bushing for self-lubricating plunger, and method for manufacturing same.

BACKGROUND

Currently, in die-casting manufacturing process, to lessen wear of the plunger and shot sleeve of an injection machine, when the plunger returns to a rear end of the shot sleeve, wax particle of fixed quantity is added before molten material is filled in the sleeve for lubrication purpose. Alternatively, when the plunger moves out of the sleeve, atomized lubricating oil may be sprayed onto the plunger tip to lubricate the plunger.

However, the above-mentioned two lubricating methods both have drawbacks. The use of wax particle or lubricating oil would generate a large amount of harmful gases under a high temperature, and generate carbon deposits during sintering process. The harmful gases and impurities will be mixed with the molten material in the shot sleeve during the forward movement of injection process. As a result, the likelihood of failed casting is increased due to defects, such as high porosity and impurities, etc. Moreover, the lubricating oil and wax particle suffering high temperature combustion would generate a large amount of carbon dioxide exhaust gas which seriously pollutes the environment of the die-casting workshop, thereby being unfavorable for the manufacturing and increasing environmental maintenance costs for the workshop.

SUMMARY OF THE DISCLOSURE

One object of the present disclosure is to provide a bushing that is more efficient, environmental friendly, and capable of self-lubricating as the temperatures changes. Another object of the present disclosure is to provide a plunger with the above-mentioned bushing, so as to address the issues raised in the background.

In order to realize the objectives of the present disclosure, the following technical solutions are proposed. A method for manufacturing a bushing of a self-lubricating plunger, including the following steps:

S1. uniformly mixing a base metal powder of 100-1000 meshes with a reinforcing metal powder of 100-1000 meshes to obtain a mixture, putting the mixture into a mold for pressing by a hydraulic press machine to form a blank, then putting the blank into a high-temperature furnace for high-temperature sintering to form a tubular metal foundation, wherein, the tubular metal foundation has a plurality of micropores;

S2. melting a metal matrix lubricant by heating up, wherein the metal matrix lubricant includes a metal substance of low melting point and a basic lubricating powder dispersed in the metal substance of low melting point, and the metal substance of low melting point has a melting point higher than a storage temperature of the bushing and lower than a working temperature of the plunger; and S3. immersing the tubular metal foundation in the molten metal matrix lubricant to fill the micropores of the tubular metal foundation with the metal matrix lubricant, then cooling down the temperature.

Further, the micropores have a diameter greater than or equal to 10 μm and less than or equal to 200 μm, the basic lubricating powder has a particle size less than or equal to 50 μm.

Further, in step S3, the method of immersing the tubular metal foundation in the molten metal matrix lubricant to fill the micropores of the tubular metal foundation with the metal matrix lubricant includes:

performing vacuum pressure treatment to make the microporous structure of the bushing filled with the metal matrix lubricant.

Further, the metal substance of low melting point accounts for 80-97 wt % of a total weight of the metal matrix lubricant.

Further, a particle size of the basic lubricating powder is less than or equal to 50 μm. Preferably, the particle size of the basic lubricating powder is greater than or equal to 5 μm and less than or equal to 40 μm.

Further, the metal substance of low melting point is one substance or a mixture of more than one substance selected from a group consisting of cesium, indium, bismuth, lead, cadmium, tin, dysprosium, gallium alloy, bismuth-based alloy, lead-based alloy, lead-tin-antimony copper.

Further, the basic lubricating powder is one substance or a mixture of more than one substance selected from a group consisting of graphite, carbon nanotubes, graphene, graphite fluoride, molybdenum disulfide, niobium diselenide, and boron nitride.

According to another aspect of the present disclosure, a bushing for a self-lubricating plunger is provided, which includes a tubular metal foundation, wherein the tubular metal foundation has a plurality of micropores; and a metal matrix lubricant filled in the micropores, wherein the metal matrix lubricant comprises a metal substance of low melting point and a basic lubricating powder dispersed in the metal substance of low melting point, the metal substance of low melting point has a melting point higher than a storage temperature of the bushing and lower than a working temperature of the plunger.

Further, a filling rate of the metal matrix lubricant ranges 10%-30%. Further, a particle size of the basic lubricating powder is less than or equal to 50 μm.

Further, the metal substance of low melting point accounts for 80-97 wt % of a total weight of the metal matrix lubricant.

Further, the metal substance of low melting point is one substance or a mixture of more than one substance selected from a group consisting of cesium, indium, bismuth, lead, cadmium, tin, dysprosium, gallium alloy, bismuth-based alloy, lead-based alloy, lead-tin-antimony copper.

Further, the basic lubricating powder is one substance or a mixture of more than one substance selected from a group consisting of graphite, carbon nanotubes, graphene, graphite fluoride, molybdenum disulfide, niobium diselenide, and boron nitride.

According to yet another aspect of the present disclosure, a self-lubricating plunger is provided, which includes a plunger body, and a bushing sleeved on the plunger body. The bushing includes a tubular metal foundation having a plurality of micropores and a metal matrix lubricant filled in the micropores, the metal matrix lubricant includes a metal substance of low melting point and a basic lubricating powder dispersed in the metal substance of low melting point, the metal substance of low melting point has a melting point higher than a storage temperature of the bushing and lower than a working temperature of the plunger.

Further, the plunger body comprises a plunger tip and an installation section, a diameter of an axial section of the plunger tip is greater than a diameter of an axial section of the installation section, such that a shoulder is formed on an outer edge at a side of the plunger tip close to the installation section.

Further, a wall thickness of the tubular metal foundation is 0.3-0.8 mm greater than a width of the shoulder.

Compared with the prior art, the present disclosure has the following advantages. The present disclosure provides a bushing of a self-lubricating plunger. According to the manufacturing processes of the bushing, base metal powders of different meshes are mixed with reinforcing metal powder and pressed to form a blank, then the blank is treated by high-temperature sintering to obtain a tubular metal foundation. The tubular metal foundation obtained by means of powder metallurgy technology has a plurality of micropores, and the diameter of the micropores depends on the meshes of the base metal powder. The tubular metal foundation is then immersed in a metal matrix lubricant including metal substance of low melting point, and the metal substance of low melting point has a melting point higher than a storage temperature of the bushing. Afterwards, the temperature is cooled down until the metal matrix lubricant is solidified in the micropores. Under the storage temperature of the bushing, the metal matrix lubricant can be stored in the micropores of the bushing in solid state, while when the temperature goes up to above the melting point, the metal matrix lubricant will get melted and transitions from solid state to liquid state in the micropores, so as to release the lubricating material and achieve self-lubricating effect. Further, before the temperature reaches the melting point, the basic lubricating powder is encapsulated by the metal substance of low melting point in solid state to isolate with the ambience, so as to avoid oxidizing reaction and exhaust generation.

The present disclosure further provides a self-lubricating plunger. The bushing having metal matrix lubricant is assembled on the self-lubricating plunger. As the temperature goes up during operation, the metal matrix lubricant transitions from solid state to liquid state, so as to achieve lubricating effect and get rid of the need to spray lubricating oil before each shot.

By controlling the proportion of the metal substance in the metal matrix lubricant, the dissolving rate of the metal matrix lubricant may be controlled and the lubricating powder can be completely encapsulated before the temperature reaches the melting point (i.e. when the metal matrix lubricant is in solid state), so as to suppress contact with the ambience and avoid oxidizing reaction and exhaust generation.

BRIEF DESCRIPTION OF THE DRAWINGS

In order to clearly explain the embodiments of the present disclosure, the drawings that would be used in describing the embodiments will briefly introduced below. It should be understood that the drawings illustrated below merely include some of the embodiments of the present disclosure, which are not intended to limit the scope of the present disclosure. For those of ordinary skill in the art, other drawings may be derived based on these drawings without creative effort.

Figure 1:
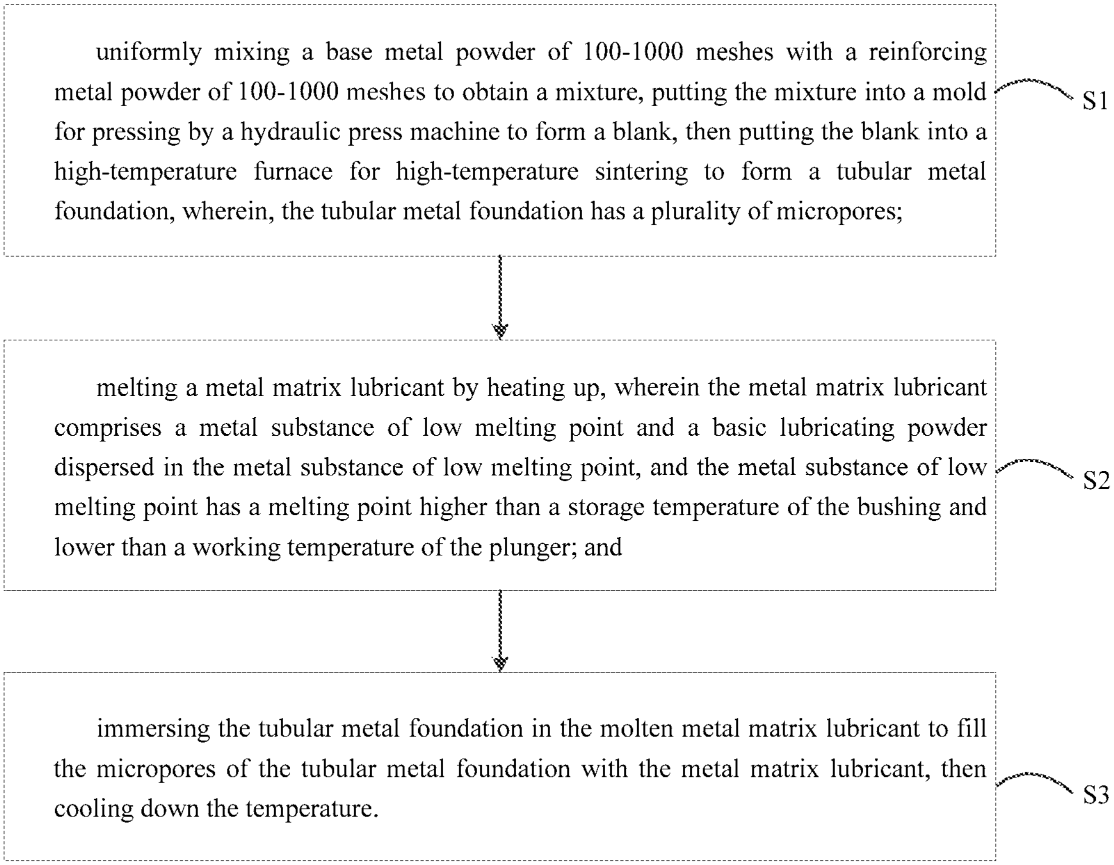
FIG. 1 is a flow chart showing a method for manufacturing a bushing of a self-lubricating plunger.
Figure 2:
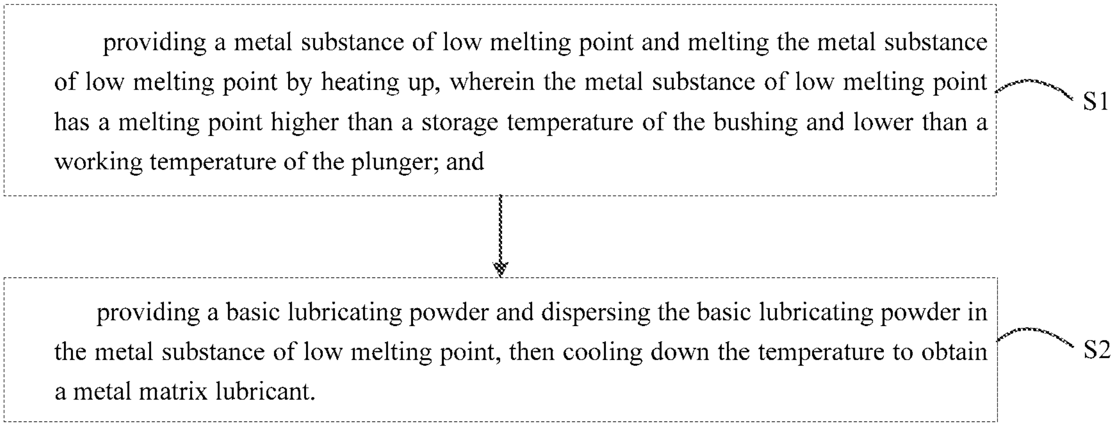
FIG. 2 is a flow chart showing a method for preparing a metal matrix lubricant.
Figure 3:
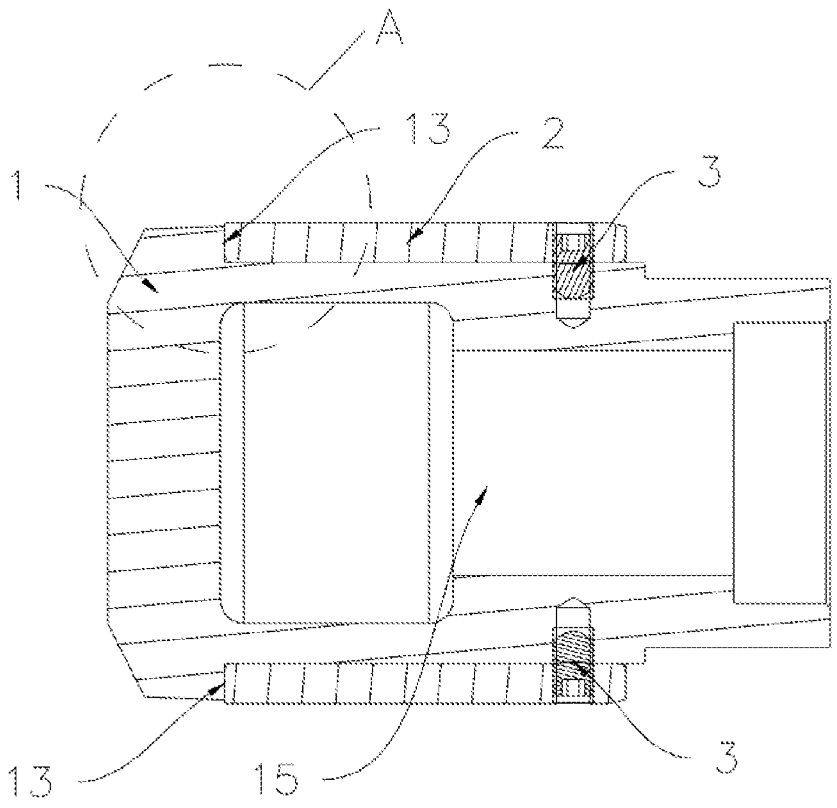
FIG. 3 is a sectional view of an assembled plunger.
Figure 4:
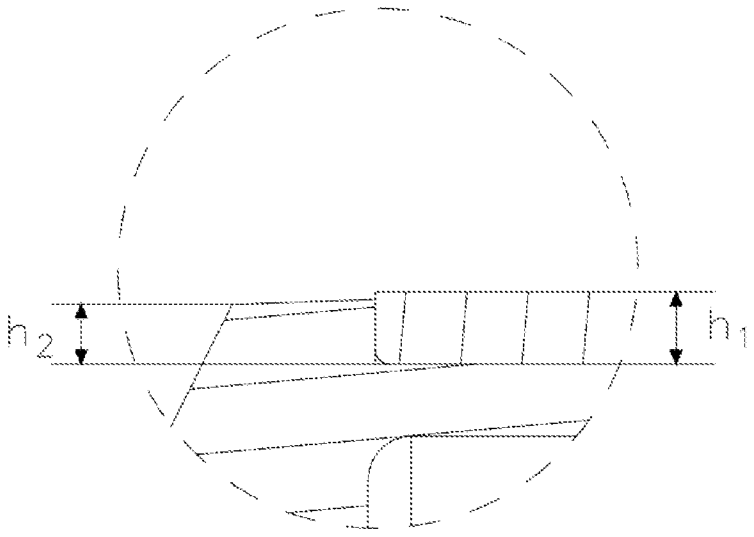
FIG. 4 is a partially enlarged view at area A in FIG. 3.
Figure 5:
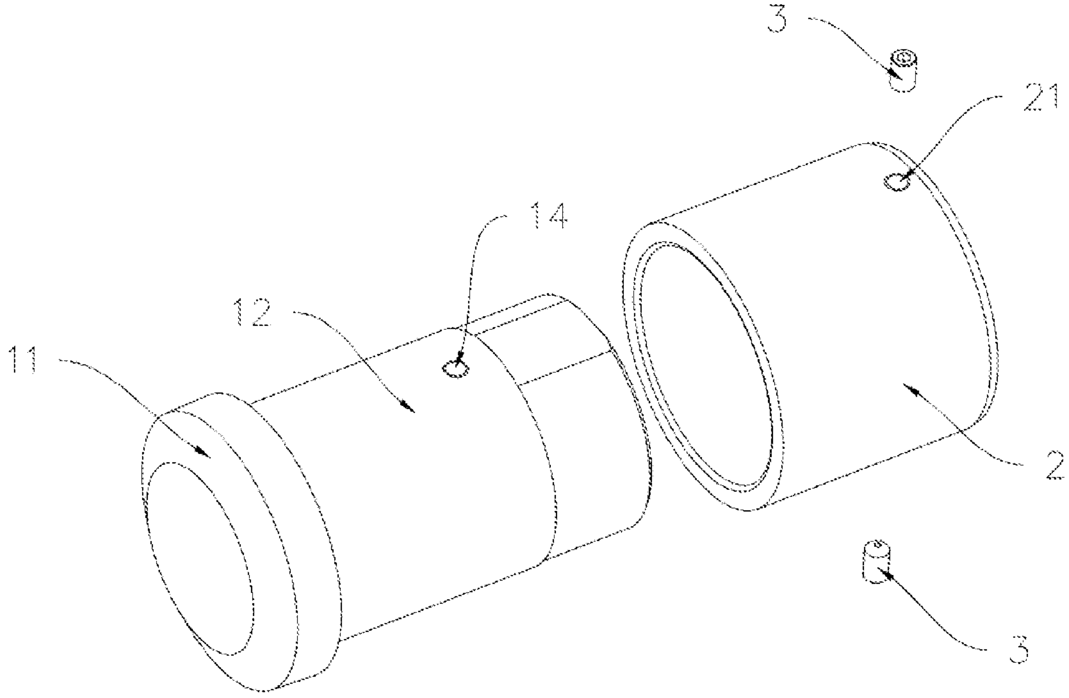
FIG. 5 is an exploded view of a plunger.

Reference numerals of the elements in the drawings are listed below:

1. Plunger body;

11. Plunger tip; 12. Installation section; 13. Shoulder; 14. Installation hole;

15. Installation cavity;

2. Bushing;

21. Connection hole;

3. Fastening screw.

DETAILED DESCRIPTION OF THE EMBODIMENTS

In order to clarify the objectives, technical solutions and advantages of the embodiments of the present disclosure, the technical solutions in the embodiments of the present disclosure will be clearly and completely described below in conjunction with the accompanying drawings. Obviously, the embodiments described below are not exhaustive, other embodiments not mentioned may also fall within the scope of the present disclosure. Based on the embodiments of the present disclosure, all other embodiments derived by those of ordinary skill in the art without putting into creative efforts should be considered as falling within the scope of the present disclosure. Accordingly, the detailed description of the embodiments of the present disclosure illustrated in the drawings is not intended to limit the scope of the disclosure as claimed. Rather, the detailed description and drawings are intended to represent selected embodiments of the present disclosure.

In the description of the present disclosure, the terms "first" and "second" are merely used for descriptive purpose. These terms cannot be understood as indicating or implying relative importance or implying the quantity of the technical features referred to. Thus, a feature limited by "first" or "second" may expressly or implicitly indicate that one or more of that feature may be included. In the context of the present disclosure, "plurality" means two or more, unless otherwise expressly and specifically defined.

The present disclosure provides a method for manufacturing a bushing of a self-lubricating plunger, which includes the following steps:

S1. uniformly mixing a base metal powder of 100-1000 meshes with a reinforcing metal powder of 100-1000 meshes to obtain a mixture, putting the mixture into a mold for pressing by a hydraulic press machine to form a blank, then putting the blank into a high-temperature furnace for high-temperature sintering to form a tubular metal foundation, wherein, the tubular metal foundation has a plurality of micropores;

S2. melting a metal matrix lubricant by heating up, wherein the metal matrix lubricant includes a metal substance of low melting point and a basic lubricating powder dispersed in the metal substance of low melting point, and the metal substance of low melting point has a melting point higher than a storage temperature of the bushing and lower than a working temperature of the plunger; and S3. immersing the tubular metal foundation in the molten metal matrix lubricant to fill the micropores of the tubular metal foundation with the metal matrix lubricant, then cooling down the temperature.

The micropores have a diameter greater than or equal to 10 μm and less than or equal to 200 μm. The basic lubricating powder has a particle size less than or equal to 50 μm, such that the metal matrix lubricant can be held in the micropores and a sufficient amount of the metal matrix lubricant can be stored inside the tubular metal foundation for lubrication.

According to the present embodiment, to manufacture the bushing 2, a base metal powder of 300-500 meshes and a reinforcing metal powder of 300-500 mesh are sintered to form a porous body with micropores interconnected to one another. The micropores can hold the metal matrix lubricant. The micropores have a diameter greater than 30 μm. The bushing 2 is immersed in the molten metal matrix lubricant to spread the metal matrix lubricant all over the micropores, then cooling treatment is performed to solidify the metal matrix lubricant in the micropores. By doing so, as the temperature goes up during the die-casting operation, the metal matrix lubricant gets melted to transition from a solid state to a liquid state, so as to release the lubricant and achieve lubricating effect.

Preferably, the base metal powder may be selected from copper powder, copper-iron-based powder, copper-nickel powder or chromium-based powder. The use of copper powder as the base metal powder has the widest applicability, long service life and low cost, and can satisfy most plunger processing requirements. Although copper-iron-based powder is cheaper than copper powder, service life of the bushing 2 made of copper-iron-based powder is shorter than the bushing 2 made of copper powder. The bushing 2 made of copper-nickel powder or chromium-based powder has a good structural strength and longer service life, but they are more costly compared with the copper-iron-based powder and copper powder. These kinds of metal powders may be selected according to specific requirements in practice. Of course, the base metal powder of the present disclosure is not limited to the above-mentioned metal powders. Other metal powders that can satisfy the desired parameters of the bushing 2, such as strength and heat resistance, may also be used.

Specifically, after the mixture of the base metal powder and the reinforcing metal powder is put into the mold, the powder mixture is subjected to a pressure of 500 MPa-800 MPa by the hydraulic press machine, so that the powder mixture is preformed in the mold. Afterwards, the blank that has been press-molded by the hydraulic press machine is put into a high-temperature furnace for sintering and molding.

Further, the sintering temperature is set according to the melting point of the selected metal powder. In the present embodiment, copper powder is selected as the base metal powder, so the sintering temperature is set as 700° C.-800° C. If other base metal material is used, such as copper-iron-based metal powder, the sintering temperature may be set as 1050° C.-1120° C.

The method of immersing the tubular metal foundation in the molten metal matrix lubricant to fill the micropores of the tubular metal foundation with the metal matrix lubricant may specifically include performing vacuum pressure treatment to make the microporous structure of the bushing filled with the metal matrix lubricant. For example, in the present embodiment, a certain amount of metal matrix lubricant is filled in a vacuum tank, then the obtained bushing 2 is placed in the vacuum tank to be immersed in the metal matrix lubricant. Then, pressure is applied to the vacuum tank to spread the metal matrix lubricant all over the microporous structure of the bushing 2.

Specifically, the bushing 2 is placed in the vacuum tank, then the vacuum tank is pressurized to 0.5 Mpa, and the pressure time is 15 minutes. By doing so, the metal matrix lubricant can be dispersed in the microporous structure of the bushing 2.

Further, after the pressurization for the vacuum tank is completed, the bushing 2 is taken out, or the remaining metal matrix lubricant in the vacuum tank is discharged, and the temperature in the vacuum tank is cooled down to lower than the the melting point of the metal matrix lubricant, such that the metal matrix lubricant within the microporous structure is condensed to a solid state. At this time, the filling rate of the metal matrix lubricant in the bushing is 10%-30%.

EXPERIMENTAL DATA

Base metal powder: copper powder;
Sintering temperature: 700° C.-800° C.;
Sintering Time: 4 h-8 h;

Embodiment A-1

80% of copper powder (400-mesh), 10% of lead powder and 10% of tin powder are uniformly mixed, and the mixture is placed in a bushing mold for pressure molding, then the obtained blank is put in a sintering furnace for high-temperature sintering.

Embodiment A-2

75% of copper powder (400-mesh), 20% of lead powder and 5% of tin powder are uniformly mixed, and the mixture is placed in a bushing mold for pressure molding, then the obtained blank is put in a sintering furnace for high-temperature sintering.

Embodiment A-3

75% of copper powder (400-mesh), 5% of beryllium powder, 10% of lead powder, and 10% of tin powder are uniformly mixed, and the mixture is placed in a bushing mold for pressure molding, then the obtained blank is put in a sintering furnace for high-temperature sintering.

Embodiment A-4

75% of copper powder (500-mesh), 5% of beryllium powder, 10% of lead powder, and 10% of tin powder are uniformly mixed, and the mixture is placed in a bushing mold for pressure molding, then the obtained blank is put in a sintering furnace for high-temperature sintering.

Embodiment A-5

75% of copper powder (300-mesh), 5% of beryllium powder, 10% of lead powder, and 10% of tin powder are uniformly mixed, and the mixture is placed in a bushing mold for pressure molding, then the obtained blank is put in a sintering furnace for high-temperature sintering.

By controlling the processing conditions and material proportions according to the above embodiments, a density of the bushing obtained from the sintering process is 6.6-7.2, the internal structure and surface of the bushing exhibit porous characteristic, wear amount: <15u; crush strength: >15 Kgf/mm$^2$; hardness: 20-50; friction coefficient: <0.15. The bushing can meet the standards for production and processing.

Moreover, according to the present embodiment, lead powder is added to the materials for making the bushing. Since the element of lead inherently has good lubricating properties, the addition of lead powder with an appropriate amount calculated in view of the material proportions contributes to an exhibition of lubricity of the bushing without affecting the structural parameters of the bushing, so as to reduce friction between the bushing and the sleeve.

According to another aspect of the present disclosure, a bushing for a self-lubricating plunger is provided. The bushing includes a tubular metal foundation and a metal matrix lubricant, the tubular metal foundation has a plurality of micropores, and the micropores are filled with the metal matrix lubricant. Specifically, the metal matrix lubricant includes a metal substance of low melting point and a basic lubricating powder dispersed in the metal substance of low melting point. The metal substance of low melting point has a melting point higher than a storage temperature of the bushing and lower than a working temperature of the plunger.

Preferably, a filling rate of the metal matrix lubricant ranges 10%-30%, such that the bushing 2 can meet the requirements on processing strength, and at the same time, the bushing can hold a sufficient amount of the metal matrix lubricant to reduce the frequency of replacement and prolong the service life.

According to yet another aspect of the present disclosure, a self-lubricating plunger is provided. The self-lubricating plunger includes a plunger body 1, a bushing 2 sleeved on the plunger body 1, and a metal matrix lubricant. The bushing 2 includes a tubular metal foundation which has a plurality of micropores. The metal matrix lubricant is filled in the micropores. The metal matrix lubricant includes a metal substance of low melting point and a basic lubricating powder dispersed in the metal substance of low melting point. The metal substance of low melting point has a melting point higher than a storage temperature of the bushing and lower than a working temperature of the plunger.

Specifically, the plunger body 1 includes a plunger tip 11 and an installation section 12. A diameter of an axial section of the plunger tip 11 is greater than a diameter of an axial section of the installation section 12, such that the outer edge of the plunger tip 11 radially extends beyond an outer wall of the installation section 12 to form a shoulder 13 at a side of the plunger tip 11 close to the installation section 12. The tubular metal foundation is sleeved on the installation section 12, and an end of the tubular metal foundation abut against the shoulder 13. The tubular metal foundation is detachably connected to the installation section 12. The tubular metal foundation has a number of micropores for storing the metal matrix lubricant, and the micropores are distributed throughout the whole structure of the tubular metal foundation.

Before use, the bushing 2 is immersed in and filled with the molten metal matrix lubricant under a certain temperature (higher than the melting point of the metal matrix lubricant), then the bushing 2 is cooled down to room temperature, such that the metal matrix lubricant is solidified in the micropores and transitioned to solid state. During operation, as the working temperature of the plunger gradually rises to higher than the melting point of the metal matrix lubricant, the metal matrix lubricant gets melted and is transitioned to liquid state, so the basic lubricating powder inside the bushing 2 is released to realize self-lubrication under working conditions. Under such condition, the metal matrix lubricant may be located in the micropores, or seep through the micropores to cover the outer surface of the bushing, so as to achieve a lubricating effect. Practically, the actual working temperature of the plunger during die-casting production ranges 185° C.-210° C. (the temperature was measured when molten aluminum is poured into the shot sleeve). Therefore, in the present embodiment, the melting point of the metal matrix lubricant may be 80° C.-170° C.

The installation section 12 is internally provided with an installation cavity 15, and the installation cavity 15 is fitted with the punch drive shaft of the die-casting machine, and the punch drive shaft may be connected with the installation cavity by threads or other fixing means. The side wall of the installation section 12 is provided with a number of grooves to limit the position of the plunger and the die-casting machine when the plunger is installed, so as to avoid relative rotation.

When the tubular metal foundation is installed on the plunger body 1, the inner wall of the tubular metal foundation fits with the outer wall of the installation section 12, and the outer wall of the tubular metal foundation radially extends beyond the sidewall of the plunger tip 11 for a first distance. Namely, the circumferential wall thickness of the tubular metal foundation is $h_1$, and the width of the shoulder 13 (i.e. the length of the outer edge of the plunger tip 11 extending beyond the installation section 12) is $h_2$, $h_1-h_2$=the first distance. Preferably, the circumferential wall thickness of the tubular metal foundation is 0.3-0.8 mm greater than the width of the shoulder 13, namely, $h_1$—$h_2$=the first distance=0.3-0.8 mm. During the die-casting process, there is friction between the bushing and the sleeve, and the metal matrix lubricant works to lubricate the tubular metal foundation. When the circumferential wall thickness of the tubular metal foundation is greater than the width of the shoulder 13, wear of the plunger caused by the inner wall of the sleeve can be avoided, while the bushing filled with lubricant can reduce the frictional resistance between the outer wall of bushing and the inner wall of the sleeve. If the first distance is less than or equal to 0, the sidewall of the plunger has friction against the inner wall of the sleeve, while there is no contact between the bushing and the inner wall of the sleeve, thus the bushing will not be able to play its lubricating function. If the first distance is too large, such as greater than 0.8 mm, not only the extra use of bushing and lubricant materials will cause a waste and raise unnecessary production costs, but also the excessive difference is unfavorable for the installation stability and working stability of the bushing and the plunger body.

Preferably, the micropores have a diameter greater than 30 μm to ensure a sufficient space for storing the metal matrix lubricant, and the diameter of the micropores can be controlled with a selection of the particle size of the metal powder. Meanwhile, the diameter of the micropores should not be too large, so as to ensure that the bushing 2 has sufficient structural strength and density. Also, large pore size may increase a releasing amount of the metal matrix lubricant at one time during the heating process. As a result, the extra part of lubricant may be wasted and the service life of a single bushing is shortened.

Specifically, the tubular metal foundation is circumferentially provided with a plurality of connection holes 21 which are spaced uniformly. According to the present embodiment, two connection holes 21 are symmetrically arranged, and the installation section 12 is correspondingly provided with installation holes 14. Fastening screw 3 passes through the connection hole 21 and the corresponding installation hole 14 to fix the bushing 2 on the installation section 12. When one bushing 2 has run out of lubricant, the bushing 2 is dismounted and replaced with a new bushing 2 filled with lubricant. The dismounted bushing may be immersed in the metal matrix lubricant again for reusing, which is convenient for maintenance and can realize recycling. According to another embodiment of the present disclosure, the bushing 2 and the plunger body 1 are not provided with additional securing structures, and the bushing 2 is attached to the plunger body 1 by interference fit based on the principle of thermal expansion and contraction. In the present disclosure, the method for attaching the bushing 2 on the plunger body 1 is not limited to the above-mentioned implementations, and other methods that can realize the attachment and detachment may also be used.

When in use, the bushing 2 may be detachably installed around the outer side of the plunger body 1. After the bushing 2 has run out of the metal matrix lubricant, the bushing 2 may be replaced with a new bushing 2 that is filled with the metal matrix lubricant, or the detached bushing is again subjected to the treatment of step S30 to re-fill the bushing with the metal matrix lubricant, and then the bushing re-filled with the metal matrix lubricant is installed on the plunger body 1 again.

The plunger manufactured according to the processes of the present disclosure is able to stably store and hold the metal matrix lubricant at normal temperature, and the metal matrix lubricant may get melted as the working temperature naturally goes up during the processing, so as to achieve the self-lubricating effect and get rid of the process of spraying lubricating oil before every shot. Accordingly, there is no need to add lubricant during the die-casting process, the likelihood that harmful gases are mixed with molten aluminum, copper, and zinc during the die-casting production is reduced, and the mechanical properties of die-casting products can be improved while exhaust emission to the die-casting workshop is reduced. Compared with the prior art, the solution of the present disclosure may realize waste gas free and open flame free. Meanwhile, since no lubricant filling mechanism is required, the equipment cost and maintenance needs can be reduced, which can ensure safety of production and save production costs.

According to yet another aspect of the present disclosure, a method for manufacturing a plunger body is provided, in which hot working die steel or ductile iron is processed by machine work, then subjected to surface nitriding treatment. Preferably, the plunger body 1 may be made of 8433 hot working die steel or H13 hot working die steel to achieve better strength and longer service life compared with ductile iron, but may lead to increased cost.

The plunger body 1 processed by cutting machine is integrally formed and has a plunger tip 11 and an installation section 12. The installation section 12 has a reduced diameter and extends from a rear end of the plunger tip 11. A space formed by the reduced diameter of the installation section 12 is used for installation of the bushing 2. The formed plunger body 1 is subjected to heat treatment to achieve a hardness ranging 42-45HRC, then surface oxidation treatment is performed.

The present disclosure also provides a method for preparing a metal matrix lubricant for self-lubricating plunger, comprising the following steps:

S1. providing a metal substance of low melting point and melting the metal substance of low melting point by heating up, wherein the metal substance of low melting point has a melting point higher than a storage temperature of the bushing and lower than a working temperature of the plunger; and S2. providing a basic lubricating powder and dispersing the basic lubricating powder in the metal substance of low melting point, then cooling down the temperature to obtain a metal matrix lubricant.

According to the present embodiment, the metal substance of low melting point accounts for 80-97 wt % of a total weight of the metal matrix lubricant, so that the basic lubricating powder can be better encapsulated in the metal substance of low melting point to isolate the lubricating powder from the ambiance when the lubricant is in solid state and avoid pre-reaction which may generate waste gas. Further, in the molten state of the lubricant, the basic lubricating powder well encapsulated by the metal substance of low melting point may better perform its lubricating effect as the lubricant is released from the micropores. By controlling the proportion of the metal substance of low melting point, the state of the molten metal matrix lubricant can be further controlled. For example, the molten metal matrix lubricant may still be stored in the micropores in the molten state, so as to lubricate and reduce resistance between the outer surface of the bushing and the inner wall of the sleeve. Alternatively, the molten metal matrix lubricant may be released from the micropores following the flow of the metal substance of low melting point in molten state to cover the outer surface of the bushing. Compared with the former case, the latter one can achieve better lubrication effect, but since the amount of lubricant that takes effect in each time is increased, the service life of a single bushing is shortened accordingly. Hence, users may choose what they need in practice.

In practice, the actual temperature of the plunger during die-casting production is measured to be 185° C.-210° C. (the temperature is measured when the molten aluminum is poured into the shot sleeve). Accordingly, in the present embodiment, the low-melting-point metal substance may have a melting point ranging 80° C.-170° C. The melting point of the low-melting-point metal substance is better not less than 80° C., because if the melting point is too close to the room temperature, the lubricant may be hard to stably maintain a solid state when being stored under room temperature, which may lead to lubricant leakage. Meanwhile, the melting point of the low-melting-point metal substance is better not greater than 185° C., because if the melting point is too large, the lubricant may get melted after the plunger has started working, and friction between the plunger and the inner wall of the sleeve may be caused under no lubricant situation. Under the action of frictional resistance, the injection speed of the plunger is decreased compared with the set value. As a result, the working accuracy and yield may be reduced. What's worse, the plunger may get stuck in the sleeve, and the die-casting machine cannot work normally. Preferably, the melting point of the low-melting metal substance has a temperature difference of 20° C.-70° C. with the actual working temperature, so that the lubricant begins to melt during the heating process and before the working temperature is reached. Of course, according to present disclosure, the melting point of the low-melting metal substance may also be other temperatures and is not limited to the above ranges. The melting point of the metal substance may be chosen according to the actual working temperature of die casting, as long as the melting point of the low-melting metal substance is lower than the actual working temperature of die casting and higher than the storage temperature (when the plunger is not working).

Preferably, the particle size of the basic lubricating powder is greater than or equal to 5 μm and less than or equal to 40 μm to ensure that the basic lubricating powder can smoothly enter and exit the micropores.

According to the present embodiment, the metal substance of low melting point may be one substance or a mixture of more than one substance selected from a group consisting of cesium, indium, bismuth, lead, cadmium, tin, dysprosium, gallium alloy, bismuth-based alloy, lead-based alloy, lead-tin-antimony copper. The lubricating powder may be one substance or a mixture of more than one substance selected from a group consisting of graphite, carbon nanotubes, graphene, graphite fluoride, molybdenum disulfide, niobium diselenide, and boron nitride.

According to yet another aspect of the present disclosure, a metal matrix lubricant for a self-lubricating plunger is provided. The metal matrix lubricant includes a metal substance of low melting point and a basic lubricating powder dispersed in the metal substance of low melting point, wherein a melting point of the metal substance of low melting point is higher than a storage temperature of the bushing and lower than a working temperature of the plunger.

Specifically, a particle size of the basic lubricating powder may be less than or equal to 50 μm. The metal substance of low melting point accounts for 80-97 wt % of a total weight of the metal matrix lubricant.

Working principle: the melting point of the metal matrix lubricant is referred to as first temperature $temp_1$, the actual working temperature of die casting is referred to as second temperature $temp_2$, and the storage temperature is referred to as third temperature $temp_3$, and $temp_3<temp_1<temp_2$. The metal matrix lubricant is in solid state under the storage temperature $temp_3$ and stored in the micropores of the bushing 2. During the heating process before processing, when the temperature reaches the first temperature $temp_1$, the metal matrix lubricant begins to get melted and transition from solid state to liquid state, so that the basic lubricating powder inside the bushing can be released for lubrication. As the heating process continues, before the temperature reaches the second temperature $temp_2$, the metal matrix lubricant gets completely melted. After completion of processing, the temperature drops down and the metal matrix lubricant resolidifies to solid state.

Experimental Data the plunger body 1 is made of ductile iron;
the plunger body 1 has a hardness of 42HRC-45HRC;
comparison test: conventional plunger, spray lubricating oil on the plunger before each die-casting work;

Embodiment B-1

80% of copper powder (400-mesh), 10% of lead powder and 10% of tin powder are uniformly mixed and put into a bushing mold for pressure molding, then the blank is placed in a sintering furnace for sintering treatment under high temperature.

The metal substances of low melting point including 5% of cesium, 60% of indium, 8% of bismuth and 20% of gallium are melted, then uniformly mixed with the basic lubricating powder including 4% of graphite fluoride (500-mesh), 1% of molybdenum disulfide (500-mesh), and 2% of niobium diselenide (500-mesh) to obtain the metal matrix lubricant with corresponding melting point. Afterwards, the metal matrix lubricant is filled in a vacuum tank, and pressurization is performed to reach a pressure of 0.5 Mpa, then the pressure is maintained for 15 minutes to fill the powder micropores in the bushing with the metal matrix lubricant, and finally the temperature is cooled down to solidify the metal matrix lubricant.

Embodiment B-2

75% of copper powder (400-mesh), 20% of lead powder and 5% of tin powder are uniformly mixed and put into a bushing mold for pressure molding, then the blank is placed in a sintering furnace for sintering treatment under high temperature.

The metal substances of low melting point including 3% of cesium, 65% of indium, 2% of francium, 5% of bismuth, and 15% of gallium are melted, then uniformly mixed with the basic lubricating powder including 4% of graphite fluoride (500-mesh), 1% of molybdenum disulfide (500-mesh), 3% of niobium diselenide (500-mesh), and 2% of boron nitride to obtain the metal matrix lubricant with corresponding melting point. Afterwards, the metal matrix lubricant is filled in a vacuum tank, and pressurization is performed to reach a pressure of 0.5 Mpa, then the pressure is maintained for 15 minutes to fill the powder micropores in the bushing with the metal matrix lubricant, and finally the temperature is cooled down to solidify the metal matrix lubricant.

Embodiment B-3

75% of copper powder (400-mesh), 10% of beryllium powder and 15% of tin powder are uniformly mixed and put into a bushing mold for pressure molding, then the blank is placed in a sintering furnace for sintering treatment under high temperature.

The metal substances of low melting point including 3.5% of cesium, 65% of indium, 2% of francium, 8% of bismuth, and 18% of gallium are melted, then uniformly mixed with the basic lubricating powder including 2% of graphite fluoride (500-mesh), 0.2% of molybdenum disulfide (500-mesh), 1% of niobium diselenide (500-mesh), and 0.3% of boron nitride to obtain the metal matrix lubricant with corresponding melting point. Afterwards, the metal matrix lubricant is filled in a vacuum tank, and pressurization is performed to reach a pressure of 0.5 Mpa, then the pressure is maintained for 15 minutes to fill the powder micropores in the bushing with the metal matrix lubricant, and finally the temperature is cooled down to solidify the metal matrix lubricant.

Embodiment B-4

75% of copper powder (400-mesh), 5% of beryllium powder, 10% of lead powder, and 10% of tin powder are uniformly mixed and put into a bushing mold for pressure molding, then the blank is placed in a sintering furnace for sintering treatment under high temperature.

The metal substances of low melting point including 3% of cesium, 70% of indium, 2% of francium, 8% of bismuth, and 12% of gallium are melted, then uniformly mixed with the basic lubricating powder including 3% of graphite fluoride (500-mesh), 0.2% of molybdenum disulfide (500-mesh), 1.5% of niobium diselenide (500-mesh), and 0.3% of boron nitride to obtain the metal matrix lubricant with corresponding melting point. Afterwards, the metal matrix lubricant is filled in a vacuum tank, and pressurization is performed to reach a pressure of 0.5 Mpa, then the pressure is maintained for 15 minutes to fill the powder micropores in the bushing with the metal matrix lubricant, and finally the temperature is cooled down to solidify the metal matrix lubricant.

Embodiment B-5

75% of copper powder (500-mesh), 5% of beryllium powder, 10% of lead powder, and 10% of tin powder are uniformly mixed and put into a bushing mold for pressure molding, then the blank is placed in a sintering furnace for sintering treatment under high temperature.

The metal substances of low melting point including 3.5% of cesium, 65% of indium, 2% of francium, 8% of bismuth, and 18% of gallium are melted, then uniformly mixed with the basic lubricating powder including 2% of graphite fluoride (600-mesh), 0.2% of molybdenum disulfide (600-mesh), 1% of niobium diselenide (600-mesh), and 0.3% of boron nitride to obtain the metal matrix lubricant with corresponding melting point. Afterwards, the metal matrix lubricant is filled in a vacuum tank, and pressurization is performed to reach a pressure of 0.5 Mpa, then the pressure is maintained for 15 minutes to fill the powder micropores in the bushing with the metal matrix lubricant, and finally the temperature is cooled down to solidify the metal matrix lubricant.

TABLE 1

| Item | Service life (shots) |
|---|---|
| Embodiment B-1 | 7000 |
| Embodiment B-2 | 6800 |
| Embodiment B-3 | 7200 |
| Embodiment B-4 | 7300 |
| Embodiment B-5 | 7500 |
| Comparative example | 3000 |

By controlling the parameters of the above reference examples, a density of the bushing obtained may reach 6.6-7.2; the internal structure and surface of the bushing exhibit porous characteristic; wear amount: <15u (<6u when immersed in mixed lubricating fluid); crush strength: >15 Kgf/mm$^2$; hardness: 20-50; friction coefficient: <0.15 (<0.06 when immersed in mixed lubricating fluid).

Table 1 exhibits the tested service life of embodiments B-1 to B-5 and the comparative example. After the bushings 2 are respectively manufactured according to the above implementations, the bushings 2 are immersed in the metal matrix lubricant, then assembled on the plunger body 1 for production and processing. By analyzing the data shown in table 1, it can be learned that embodiment B-5 is the optimal implementation for product because it has the longest service life, but relatively high cost. While, embodiment B-1 is the best implementation on the whole because it has good wear resistance and low cost. Hence, embodiment B-1 has high cost performance and is highly suitable for mass production. Nevertheless, users may choose what they need in practice. Specifically, it can be learned from table 1 that the service life of embodiment B-1 is about 7000 shots, the service life of embodiment B-5 is about 7500 shots, and the service life of the comparative example (conventional plunger) is about 3000 shots. The plunger manufactured according to the present disclosure may achieve a service life that is more than two times of the conventional plunger.

The plunger manufactured according to the present disclosure is able to stably store the metal matrix lubricant at normal temperature. As the working temperature naturally goes up during the die casting process, the metal matrix lubricant gets spontaneously melted to achieve the self-lubricating effect, thus the process of spraying lubricating oil before each shot is not needed anymore. Accordingly, there is no need to add lubricant during the die-casting process, the likelihood that harmful gases are mixed with molten aluminum, copper, and zinc during the die-casting production is reduced, and the mechanical properties of die-casting products can be improved while exhaust emission to the die-casting workshop is reduced. Thus, the present disclosure can ensure safe production and improve processing efficiency.

The above descriptions merely include some of the preferred embodiments of the present disclosure, and are not intended to limit the scope of the present disclosure. For those skilled in the art, the present disclosure may have various modifications and changes. Any modification, equivalent substitution, improvement, and so on that are made without departing from the spirit and principle of the present disclosure should be considered as falling within the scope of the present disclosure.

What is claimed is:

1. A method for manufacturing a bushing of a self-lubricating plunger, comprising:

S1. uniformly mixing a base metal powder of 100-1000 meshes with a reinforcing metal powder of 100-1000 meshes to obtain a mixture, putting the mixture into a mold for pressing by a hydraulic press machine to form a blank, then putting the blank into a high-temperature furnace for high-temperature sintering to form a tubular metal foundation, wherein, the tubular metal foundation has a plurality of micropores;

S2. melting a metal matrix lubricant by heating up, wherein the metal matrix lubricant comprises a metal substance of low melting point and a basic lubricating powder dispersed in the metal substance of low melting point, and the metal substance of low melting point has a melting point higher than a storage temperature of the bushing and lower than a working temperature of the plunger, the working temperature of the plunger ranges 185° C.-210° C., the melting point of the metal substance of low melting point is 80° C.-170° C.; wherein the metal substance of low melting point is one substance or a mixture of more than one substance selected from a group consisting of cesium, indium, bismuth, lead, cadmium, tin, dysprosium, gallium alloy, bismuth-based alloy, lead-based alloy, lead-tin-antimony copper; the metal substance of low melting point accounts for 80-97 wt % of a total weight of the metal matrix lubricant; and S3. immersing the tubular metal foundation in the molten metal matrix lubricant to fill the micropores of the tubular metal foundation with the metal matrix lubricant, then cooling down the temperature.

2. The method for manufacturing the bushing of the self-lubricating plunger according to claim 1, wherein the micropores have a diameter greater than or equal to 10 μm and less than or equal to 200 μm, the basic lubricating powder has a particle size less than or equal to 50 μm.

3. The method for manufacturing the bushing of the self-lubricating plunger according to claim 1, wherein in step S3, the method of immersing the tubular metal foundation in the molten metal matrix lubricant to fill the micropores of the tubular metal foundation with the metal matrix lubricant comprises:

performing vacuum pressure treatment to make the microporous structure of the bushing filled with the metal matrix lubricant.

4. The method for manufacturing the bushing of the self-lubricating plunger according to claim 1, wherein a particle size of the basic lubricating powder is less than or equal to 50 μm.

5. The method for manufacturing the bushing of the self-lubricating plunger according to claim 4, wherein the particle size of the basic lubricating powder is greater than or equal to 5 μm and less than or equal to 40 μm.

6. The method for manufacturing the bushing of the self-lubricating plunger according to claim 1, wherein the basic lubricating powder is one substance or a mixture of more than one substance selected from a group consisting of graphite, carbon nanotubes, graphene, graphite fluoride, molybdenum disulfide, niobium diselenide, and boron nitride.

* * * * *